(12) United States Patent
Turner et al.

(10) Patent No.: US 10,720,045 B2
(45) Date of Patent: Jul. 21, 2020

(54) REMOTE VEHICLE SYSTEM CONFIGURATION, CONTROL, AND TELEMATICS

(71) Applicant: DIRECTED, LLC, Vista, CA (US)

(72) Inventors: James S. Turner, Mesa, AZ (US); Luc Samson, Saint-Jacques-le-Mineur (CA)

(73) Assignee: DIRECTED, LLC, Vista, CA (US)

( * ) Notice: Subject to any disclaimer, the term of this patent is extended or adjusted under 35 U.S.C. 154(b) by 0 days.

(21) Appl. No.: 16/269,321

(22) Filed: Feb. 6, 2019

(65) Prior Publication Data

US 2019/0279499 A1  Sep. 12, 2019

Related U.S. Application Data

(63) Continuation of application No. 15/862,630, filed on Jan. 4, 2018, now Pat. No. 10,249,182.

(51) Int. Cl.
*G08C 17/02* (2006.01)
*H04L 12/40* (2006.01)
(Continued)

(52) U.S. Cl.
CPC .............. *G08C 17/02* (2013.01); *B60R 25/24* (2013.01); *G06F 8/61* (2013.01); *G06F 8/65* (2013.01);
(Continued)

(58) Field of Classification Search
None
See application file for complete search history.

(56) References Cited

U.S. PATENT DOCUMENTS

| 3,657,720 A | 4/1972 | Avdenko et al. |
| 4,037,409 A | 7/1977 | Leibach |

(Continued)

FOREIGN PATENT DOCUMENTS

| CA | 1130426 A | 8/1982 |
| CA | 2426670 A1 | 7/2003 |

(Continued)

OTHER PUBLICATIONS

RE47,354, US Reissue of U.S. Pat. No. 6,924,750 (cited separately), Apr. 16, 2019, Flick, publication code E.

(Continued)

*Primary Examiner* — Carlos Garcia
(74) *Attorney, Agent, or Firm* — Anatoly S. Weiser, Esq.; IPLCounsel.com

(57) ABSTRACT

A vehicle control system (VCS) includes external communication interfaces, such as a Bluetooth interface, for communicating with a user communication and control device, such as a smart phone or a tablet. The user is enabled to operate certain features of the vehicle, such as the remote start, power locks/trunk, climate control, and security features, through the smart phone. The VCS may also communicate with a remote server via the user's smartphone, for example, providing telematics data and receiving service reminders for display to the user on the smartphone, the VCS, or a display built into the vehicle. The VCS may be custom installed in the vehicle using the user's or the installer's smartphone, without a physical connection from the VCS to the smartphone.

20 Claims, 4 Drawing Sheets

(51) Int. Cl.
  *H04W 4/44* (2018.01)
  *G06F 8/61* (2018.01)
  *G06F 8/65* (2018.01)
  *B60R 25/24* (2013.01)
  *H04W 4/40* (2018.01)
  *B60R 25/20* (2013.01)
  *B60R 25/10* (2013.01)
  *B60R 25/01* (2013.01)
  *B60R 25/33* (2013.01)
  *H04W 4/80* (2018.01)

(52) U.S. Cl.
  CPC .............. *H04L 12/40* (2013.01); *H04W 4/40* (2018.02); *H04W 4/44* (2018.02); *B60R 25/01* (2013.01); *B60R 25/1003* (2013.01); *B60R 25/209* (2013.01); *B60R 25/33* (2013.01); *B60R 2325/101* (2013.01); *B60R 2325/205* (2013.01); *B60R 2325/40* (2013.01); *H04L 2012/40215* (2013.01); *H04L 2012/40273* (2013.01); *H04W 4/80* (2018.02)

(56) References Cited

U.S. PATENT DOCUMENTS

| | | |
|---|---|---|
| 4,056,701 A | 11/1977 | Weber |
| 4,345,554 A | 8/1982 | Hildreth et al. |
| 4,577,599 A | 3/1986 | Chmielewski |
| 4,674,454 A | 6/1987 | Phairr |
| 4,703,823 A | 11/1987 | Yogo |
| 4,754,255 A | 6/1988 | Sanders et al. |
| 4,757,304 A | 7/1988 | Rho |
| 4,866,434 A | 9/1989 | Keenan |
| 4,887,064 A | 12/1989 | Drori et al. |
| 4,890,108 A | 12/1989 | Drori et al. |
| 4,892,073 A | 1/1990 | Yamamoto et al. |
| 4,893,240 A | 1/1990 | Karkouti |
| 5,223,844 A | 6/1993 | Mansell et al. |
| 5,349,931 A | 9/1994 | Gottlieb et al. |
| 5,543,776 A | 8/1996 | L'Esperance et al. |
| 5,548,163 A | 8/1996 | French |
| 5,557,254 A | 9/1996 | Johnson et al. |
| 5,602,535 A | 2/1997 | Boyles et al. |
| 5,652,599 A | 7/1997 | Pitta et al. |
| 5,654,688 A | 8/1997 | Allen et al. |
| 5,719,551 A | 2/1998 | Flick |
| 5,754,117 A | 5/1998 | Inamori et al. |
| 5,787,367 A | 7/1998 | Berra |
| 5,806,488 A | 9/1998 | Imberg |
| 5,838,251 A | 11/1998 | Brinkmeyer et al. |
| 5,905,315 A | 5/1999 | Lefebvre et al. |
| 5,940,007 A | 8/1999 | Brinkmeyer et al. |
| 5,945,921 A | 8/1999 | Seo et al. |
| 5,983,850 A | 11/1999 | Vilou |
| 6,011,460 A | 1/2000 | Flick |
| 6,075,454 A | 6/2000 | Yamasaki |
| 6,127,961 A | 10/2000 | Stacy et al. |
| 6,150,928 A | 11/2000 | Murray |
| 6,243,022 B1 | 6/2001 | Furukawa |
| 6,249,216 B1 | 6/2001 | Flick |
| 6,275,147 B1 | 8/2001 | Flick |
| 6,335,679 B1 | 1/2002 | Thomas et al. |
| 6,351,703 B1 | 2/2002 | Avery, Jr. |
| 6,424,056 B1 | 7/2002 | Irvin |
| 6,445,998 B2 | 9/2002 | Ando |
| 6,452,484 B1 | 9/2002 | Drori |
| 6,509,839 B2 | 1/2003 | Nagatuska |
| 6,509,868 B2 | 1/2003 | Flick |
| 6,512,465 B2 | 1/2003 | Flick |
| 6,561,151 B1 | 5/2003 | Wisnia et al. |
| 6,611,201 B1 | 8/2003 | Bishop et al. |
| 6,650,236 B2 | 11/2003 | Ghabra et al. |
| 6,662,085 B2 | 12/2003 | Chang |
| 6,696,927 B2 | 2/2004 | Flick |
| 6,697,719 B2 | 2/2004 | Stouffer et al. |
| 6,703,919 B2 | 3/2004 | Baset |
| 6,703,946 B2 | 3/2004 | Flick |
| 6,710,472 B2 | 3/2004 | Murfin |
| 6,737,962 B2 | 5/2004 | Mayor |
| 6,737,989 B2 | 5/2004 | Flick |
| 6,741,187 B2 | 5/2004 | Flick |
| 6,765,499 B2 | 7/2004 | Flick |
| 6,771,188 B2 | 8/2004 | Flick |
| 6,774,779 B2 | 8/2004 | Lin |
| 6,791,449 B2 | 9/2004 | Dewan |
| 6,798,355 B2 | 9/2004 | Flick |
| 6,798,356 B2 | 9/2004 | Flick |
| 6,803,861 B2 | 10/2004 | Flick |
| 6,812,829 B1 | 11/2004 | Flick |
| 6,816,089 B2 | 11/2004 | Flick |
| 6,845,313 B2 | 1/2005 | Hasegawa et al. |
| 6,853,841 B1 | 2/2005 | St. Pierre |
| 6,900,723 B2 | 5/2005 | Yamanaka et al. |
| 6,918,368 B2 | 7/2005 | Nantz et al. |
| 6,924,750 B2 | 8/2005 | Flick |
| 6,949,932 B2 | 9/2005 | Sievers et al. |
| 6,972,667 B2 | 12/2005 | Flick |
| 6,980,095 B2 | 12/2005 | Wright et al. |
| 7,010,402 B2 | 3/2006 | Flick |
| 7,015,830 B2 | 3/2006 | Flick |
| 7,050,783 B2 | 5/2006 | Curtiss et al. |
| 7,061,137 B2 | 6/2006 | Flick |
| 7,069,127 B2 | 6/2006 | Stouffer et al. |
| 7,109,908 B2 | 9/2006 | Griesau et al. |
| 7,149,623 B2 | 12/2006 | Flick |
| 7,154,428 B2 | 12/2006 | de Clercq et al. |
| 7,205,679 B2 | 4/2007 | Flick |
| 7,248,150 B2 | 7/2007 | Mackjust et al. |
| 7,305,293 B2 | 12/2007 | Flick |
| 7,312,696 B2 | 12/2007 | Flick |
| 7,343,244 B2 | 3/2008 | Flick |
| 7,366,589 B2 | 4/2008 | Habermas |
| 7,378,945 B2 | 5/2008 | Flick |
| 7,379,730 B2 | 5/2008 | Flick et al. |
| 7,502,687 B2 | 3/2009 | Flick |
| 7,519,400 B2 | 4/2009 | Dery |
| 7,647,147 B2 | 1/2010 | Fortin et al. |
| 7,659,810 B2 | 2/2010 | Flick |
| 7,659,811 B2 | 2/2010 | Flick |
| 7,720,597 B2 | 5/2010 | Flick |
| 7,859,389 B2 | 12/2010 | Baumgartner et al. |
| 7,868,736 B2 | 1/2011 | Fukushima et al. |
| 7,898,386 B2 | 3/2011 | Wisnia |
| 7,898,404 B2 | 3/2011 | Flick |
| 7,899,592 B2 | 3/2011 | Yaqub |
| 8,032,278 B2 | 10/2011 | Flick |
| 8,061,626 B2 | 11/2011 | Flick |
| 8,090,499 B2 | 1/2012 | Tamai |
| 8,112,185 B2 | 2/2012 | Wu |
| 8,125,099 B2 | 2/2012 | Flick |
| 8,217,754 B1 | 7/2012 | Lerner |
| 8,258,948 B2 | 9/2012 | Flick et al. |
| 8,274,378 B2 | 9/2012 | Flick |
| 8,274,379 B2 | 9/2012 | Flick |
| 8,313,039 B2 | 11/2012 | Flick et al. |
| 8,362,886 B2 | 1/2013 | Flick |
| 8,410,929 B2 | 4/2013 | Flick et al. |
| 8,493,191 B2 | 7/2013 | Flick |
| 8,768,565 B2 * | 7/2014 | Jefferies ................. G07B 15/00 701/32.7 |
| 8,798,873 B2 | 8/2014 | Cui |
| 8,856,780 B2 | 10/2014 | Boulais |
| 8,938,565 B2 | 1/2015 | Aubertin et al. |
| 9,031,546 B2 | 5/2015 | Flick |
| 9,140,228 B2 | 9/2015 | Flick |
| 9,159,233 B2 | 10/2015 | Flick |
| 9,170,585 B2 | 10/2015 | Flick |
| 9,238,449 B2 | 1/2016 | Flick |
| 9,416,762 B2 | 8/2016 | Flick |
| 9,458,814 B2 | 10/2016 | Flick |
| 9,527,478 B2 | 12/2016 | Flick |
| 9,582,991 B2 | 2/2017 | Flick |
| 9,656,631 B1 | 5/2017 | Flick |

(56) References Cited

U.S. PATENT DOCUMENTS

| | | | |
|---|---|---|---|
| 9,666,005 B2 * | 5/2017 | Ellis | G07C 9/00309 |
| 9,725,069 B2 * | 8/2017 | Krishnan | H04W 4/80 |
| 9,797,183 B2 | 10/2017 | Flick | |
| 9,911,255 B2 * | 3/2018 | Lee | G07C 9/00007 |
| 9,919,682 B2 | 3/2018 | Flick | |
| 9,925,956 B2 | 3/2018 | Flick | |
| 9,947,153 B2 * | 4/2018 | Bergerhoff | B60R 25/04 |
| 9,967,717 B2 * | 5/2018 | Buttolo | H04W 4/046 |
| 9,981,615 B2 | 5/2018 | Flick | |
| 9,981,616 B2 | 5/2018 | Flick | |
| 10,049,563 B2 | 8/2018 | Flick | |
| 10,127,174 B2 | 11/2018 | Flick | |
| 10,180,689 B2 | 1/2019 | Flick | |
| 2002/0004694 A1 | 1/2002 | McLeod et al. | |
| 2003/0147534 A1 | 8/2003 | Ablay et al. | |
| 2003/0233429 A1 | 12/2003 | Matte et al. | |
| 2004/0049325 A1 | 3/2004 | Flick et al. | |
| 2004/0118916 A1 | 6/2004 | He | |
| 2004/0196141 A1 | 10/2004 | Yoshida et al. | |
| 2004/0249544 A1 | 12/2004 | Lohberg | |
| 2005/0099275 A1 | 5/2005 | Kamdar et al. | |
| 2006/0095197 A1 | 5/2006 | Nishi et al. | |
| 2007/0118623 A1 | 5/2007 | Fortin et al. | |
| 2008/0059806 A1 | 3/2008 | Kishida et al. | |
| 2008/0101613 A1 | 5/2008 | Brunts et al. | |
| 2011/0112969 A1 * | 5/2011 | Zaid | G06Q 10/02 705/50 |
| 2011/0291797 A1 | 12/2011 | Tessier et al. | |
| 2014/0169564 A1 * | 6/2014 | Gautama | G07C 9/00309 380/270 |

FOREIGN PATENT DOCUMENTS

| | | |
|---|---|---|
| CA | 2415023 A1 | 8/2003 |
| CA | 2415038 A1 | 8/2003 |
| CA | 2415011 A1 | 10/2003 |
| CA | 2451487 A1 | 3/2004 |
| CA | 2451490 A1 | 3/2004 |
| CA | 2452296 A1 | 3/2004 |
| CA | 2454089 A1 | 4/2004 |
| CA | 2414991 A1 | 6/2004 |
| CA | 2415041 A1 | 6/2004 |
| CA | 2502893 A1 | 7/2005 |
| CA | 2500929 A1 | 9/2006 |
| CA | 2568114 A1 | 5/2007 |
| CA | 2704810 A1 | 8/2010 |
| CA | 2845951 A1 | 9/2014 |
| CA | 2845954 A1 | 9/2014 |
| CA | 2845960 A1 | 9/2014 |
| CA | 2882465 A1 | 9/2015 |
| CA | 2921331 A1 | 8/2016 |
| CA | 2921332 A1 | 8/2016 |
| CA | 2925135 A1 | 10/2016 |
| CA | 2942498 A1 | 5/2017 |
| CA | 2942502 A1 | 5/2017 |
| CA | 2951679 A1 | 7/2017 |
| CA | 2951747 A1 | 7/2017 |
| CA | 2974521 A1 | 2/2018 |
| EP | 0067315 A1 | 12/1982 |
| EP | 0787875 A2 | 8/1997 |
| EP | 1255235 A1 | 11/2002 |
| GB | 2119552 B | 11/1983 |
| GB | 2257552 B | 1/1993 |
| GB | 2286163 A | 8/1995 |
| GB | 2388231 A | 11/2003 |
| JP | H10205421 A | 8/1998 |
| KR | 20040076431 A | 9/2004 |
| WO | WO1992019475 A1 | 11/1992 |
| WO | WO1999005484 A1 | 2/1999 |
| WO | WO2003100614 A2 | 12/2003 |
| WO | WO2005020622 A1 | 3/2005 |

OTHER PUBLICATIONS

RE47,225, US Reissue of U.S. Pat. No. 7,015,830 (cited separately), Feb. 5, 2019, Flick, publication code E.

Respondent's Automotive Data Solutions, Inc. and Firstech, LLC's Notice of Prior Art, ITC Investigation No. 337-TA-1152.

* cited by examiner

REMOTE VEHICLE SYSTEM CONFIGURATION, CONTROL, AND TELEMATICS

CROSS-REFERENCE TO RELATED APPLICATION

This application is a continuation of acid claims priority to U.S. patent application Ser. No. 15/862,630, entitled REMOTE VEHICLE SYSTEM CONFIGURATION, CONTROL, AND TELEMATICS, filed Jan. 4, 2018, which is hereby incorporated by reference in its entirety as if fully set forth herein, including Specification, Figures, Claims, and all other matter.

FIELD OF THE DISCLOSURE

This disclosure relates generally to the field of wireless configuring and reconfiguring vehicle control systems, to wireless user control of vehicle systems, and to telematics information exchange between vehicles and remote servers.

BACKGROUND

Vehicle control systems are typically aftermarket electronic systems installed in vehicles for consumers' convenience. The functionality provided by such systems may include remote start capability, control of security and convenience features, climate control, and others. Telematics systems include systems that allow monitoring of the vehicle usage and performance, and communicating with the vehicle and the user of the vehicle.

A need in the art exists for improved techniques for initially configuring and later reconfiguring vehicle control systems, for improved techniques for communicating with vehicle control systems, and for improved communication techniques with telematics systems.

SUMMARY

This document describes embodiments, variants, and examples implementing novel techniques for addressing one or more of the needs identified above, and/or other needs. Selected embodiments described in this document include methods, apparatus, and articles of manufacture that enable wireless configuration, reconfiguration, and user control of vehicle systems; and improved connectivity to remote servers.

In an embodiment, a vehicle control system (VCS) for installation in a vehicle includes a processor; an external wireless radio frequency (RF) interface; a memory module comprising non-volatile programmable memory and storing instructions for execution by the processor; an interface to vehicle systems; a remote start module; and a bus coupling the processor to the external wireless RF interface, the memory module, the vehicle systems interface, and the remote start module. The processor is configured to execute the instructions to read vehicle information that identifies the vehicle, to transmit through the external wireless RF interface the vehicle information to a user control and communication device (UCCD) to enable the UCCD to obtain configuration parameters for installation of the VCS in the vehicle, to receive through the external wireless RF interface the configuration parameters from the UCCD, to store the configuration parameters in the non-volatile programmable memory, and to configure the VCS in accordance with the configuration parameters.

In an embodiment, method of operating a vehicle control system (VCS) installed in a vehicle includes: reading vehicle information that identifies the vehicle from a memory of the vehicle; transmitting the vehicle information through an external wireless RF interface of the VCS to a user control and communication device (UCCD) to enable the UCCD to obtain configuration parameters for installation of the VCS in the vehicle; receiving through the external wireless RF interface the configuration parameters from the UCCD; storing the configuration parameters received from the UCCD in a non-volatile programmable memory of the VCS; and configuring the VCS in accordance with the configuration parameters.

In an embodiment, an article of manufacture includes at least one non-volatile machine-readable storage medium with program code stored in the at least one non-volatile machine-readable storage medium. When the program code is executed by a processor of a vehicle control system (VCS) installed in a vehicle, it configures the VCS to read vehicle information that identifies the vehicle from a memory of the vehicle; to transmit the vehicle information through an external wireless RF interface of the VCS to a user control and communication device (UCCD) to enable the UCCD to obtain configuration parameters for installation of the VCS in the vehicle; to receive through the external wireless RF interface the configuration parameters from the UCCD; to store the configuration parameters received from the UCCD in a non-volatile programmable memory of the VCS; and to configure the VCS in accordance with the configuration parameters.

In an embodiment, a mobile communication device stores machine-executable instructions, wherein the instructions configure the mobile communication device to: pair with a vehicle control system (VCS) installed in a vehicle through a radio frequency (RF) link; request vehicle information for configuring the VCS in the vehicle; transmit the vehicle information to a remote server; receive from the remote server information for configuring the VCS for the vehicle; receive from a user of the UCCD responses regarding configuration of the VCS in the vehicle; and transmit to the VCS through the RF link configuration parameters based on the responses and the information regarding configuration of the VCS.

Various features and aspects will be better understood with reference to the following description, drawings, and appended claims (if any).

DETAILED DESCRIPTION

The words "embodiment," "variant," "example," and similar words and expressions as used in this document refer to a particular apparatus, process, or article of manufacture, and not necessarily to the same apparatus, process, or article of manufacture. Thus, "one embodiment" (or a similar word/expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and are not necessarily strictly limiting.

The words "couple," "connect," and similar words/expressions with their inflectional morphemes, as well as similar words and phrases, do not necessarily import an immediate or direct connection, but include within their meaning connections through mediate elements.

The expression "processing logic" should be understood as selected steps/decision blocks and/or hardware/software/firmware for implementing the selected steps/decision blocks. "Decision block" means a step in which a decision is made based on some condition, and subsequent process flow is selected based on whether the condition is met or not.

Some definitions have been explicitly provided above. Other and further explicit and implicit definitions and clarifications of definitions ma be found throughout this document.

Figure 1:
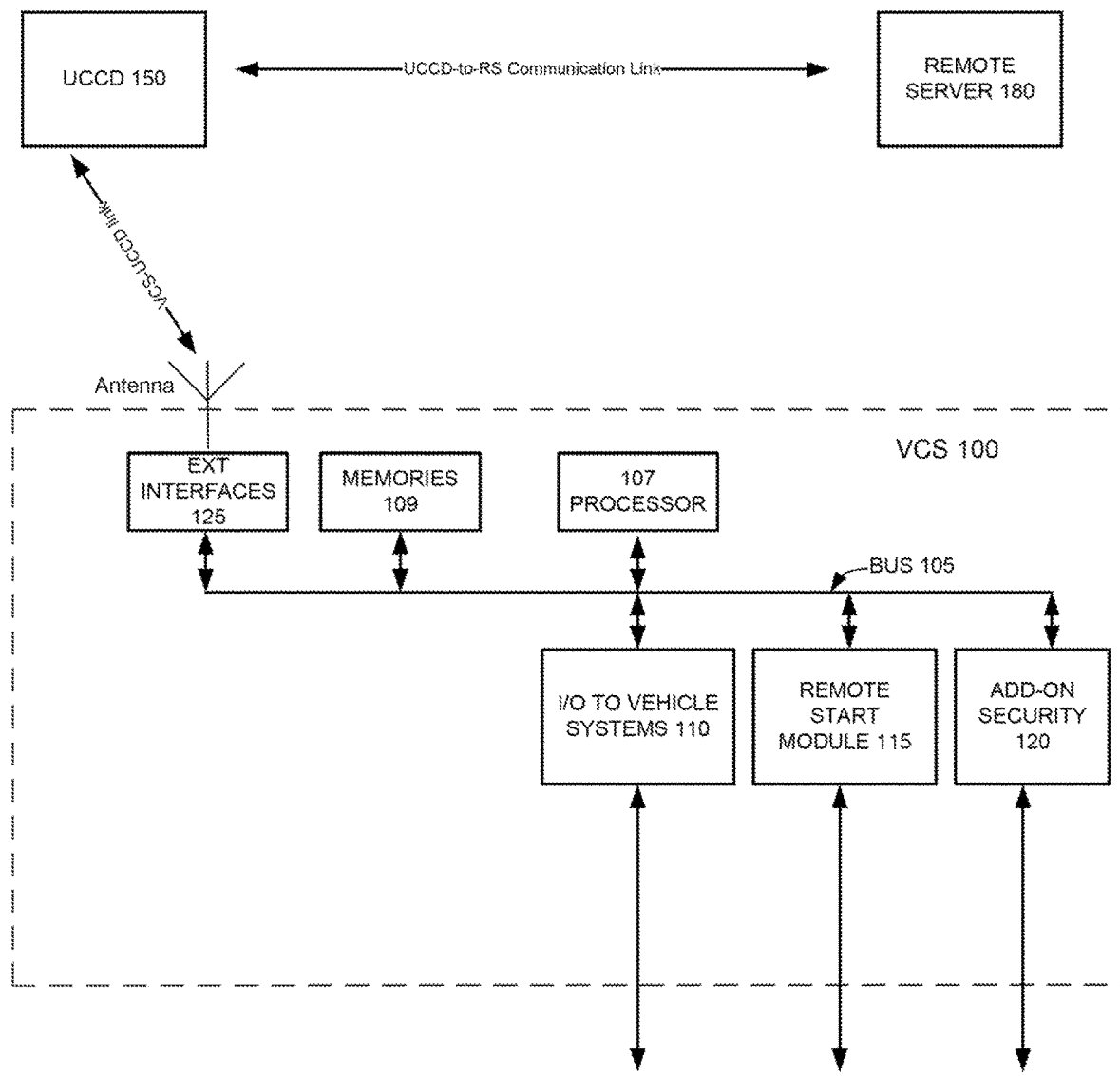
FIG. 1 illustrates selected components of a Vehicle Control System in communication with a User Control and Communication Device (such as a smart phone or tablet), configured in accordance with selected aspects described in this document.

FIG. 1 illustrates selected components of a vehicle control system ("VCS") 100 in communication with a user control and communication device ("UCCD") 150 and a remote server ("RS") 180. The VCS 100 may be, for example, a remote start system (such as remote start systems of Directed Electronics, Inc.). The UCCD 150 may be, for example, a portable handheld communication device such as a smartphone, a tablet, and a personal digital assistant; a in computer such as laptop computer and a desktop computer. The "user" of the UCCD 150 may be the user of the vehicle, and/or the installer who installs/configures/re-configures the VCS 100 in the vehicle. The UCCD may execute an application ("app") for communicating with the VCS 100 and the RS 180. The application may be for allowing the user of the vehicle to control the vehicle, and/or to allow an installer to install/initialize/configure/re-configure the VCS 100. The RS 180 may be, for example, a cloud-based system; it may be configured to receive and analyze telematics data and provide functionality responsive to the telematics data, such as service reminders and warnings regarding the state of the vehicle.

The VCS 100 includes a bus 105 that provides communication/networking capability between and among the components of the VCS 100. The bus 105 may be, for example, a bus in accordance with one of the Controller Area Network standards, a k a "CAN bus"; or a processor-based system bus.

The VCS 100 includes a processing module 107, for example, a microprocessor and supporting electronics. The VCS 100 also includes a memory module 109 that can store instructions executable by the processing module 107; the memory module 109 may include one or more memories of same or different types, such as ROMs, PROMs, EPROMS, EEPROMS, flash memories, optical disks, magnetic storage devices, and/or other memories. In embodiments, the memory module 109 includes at least some programmable, non-volatile memory.

The VCS 100 also includes an interface or interfaces 110 to vehicle control modules, for example, the following: an engine computer (engine control module or ECM); a transmission computer (transmission control module or TCM); built-in vehicle firmware; built-in security features of the vehicle; a telematics module; and data storage for data that includes the vehicle's usage and performance data, such as OBD II data (which data storage may instead be included in a telematics module.

The VCS 100 also includes a remote start module 115, which allows starting of vehicle by the VCS 100, in response to appropriate commands, for example, remote start commands received from a user of the UCCD 150. The remote start module 115 may also interact with the vehicle control modules through the interfaces 110, which the remote start module 115 may access through the bus 105.

The VCS 100 additionally includes add-on security module 120, which may connect to and monitor various sensors (e.g., shock/vibration, proximity, intrusion), and which may operate and/or control various convenience features (e.g., power windows, power locks, power seats, steering wheel telescoping and tilt positions, audio system presets and other audio system controls).

The VCS 100 further includes an external communication interface 125, which can be, for example, a Bluetooth interface. The interface 125 can provide communications between the UCCD 150 and the various components of the VCS 100 (e.g., the remote start module 115, the interfaces 110 and the devices connected to the interfaces 110, the security module 120, and other VCS 100 components). The external communication interface 125 may also serve as a bridge between the UCCD 150 and the bus 105, and thus enable the UCCD 150 to communicate with other devices connected to the bus 105 directly (e.g., the remote start module 115, the add-on security module 120) and indirectly through the interfaces 110 (e.g., the engine control module, transmission control module, built-in vehicle firmware, built-in security features of the vehicle, telematics module, usage and performance data storage).

In embodiments, the interface 125 may be another type of RF interface that enables vehicle communications to longer distances, for example, 1500 feet or one mile, and even longer distances; the other type of RF interface may operate, for example, on the 900 MHz hand. In embodiments, the interface 125 is a Bluetooth interface, and the VCS 100 further includes another type of RF interface that enables vehicle communications to longer distances, for example, 1500 feet or one mile, and even longer distances; the other type of RF interface may operate, example, on the 900 MHz band. In embodiments, the interface 125 is a Bluetooth interface and further includes the other type of RF interface and/or a cellular interface that can communicate with the UCCD 150 and/or the remote server 180. In embodiments, however, the VCS 100 communicates with the RS 180 via the UCCD 150.

Figure 2:
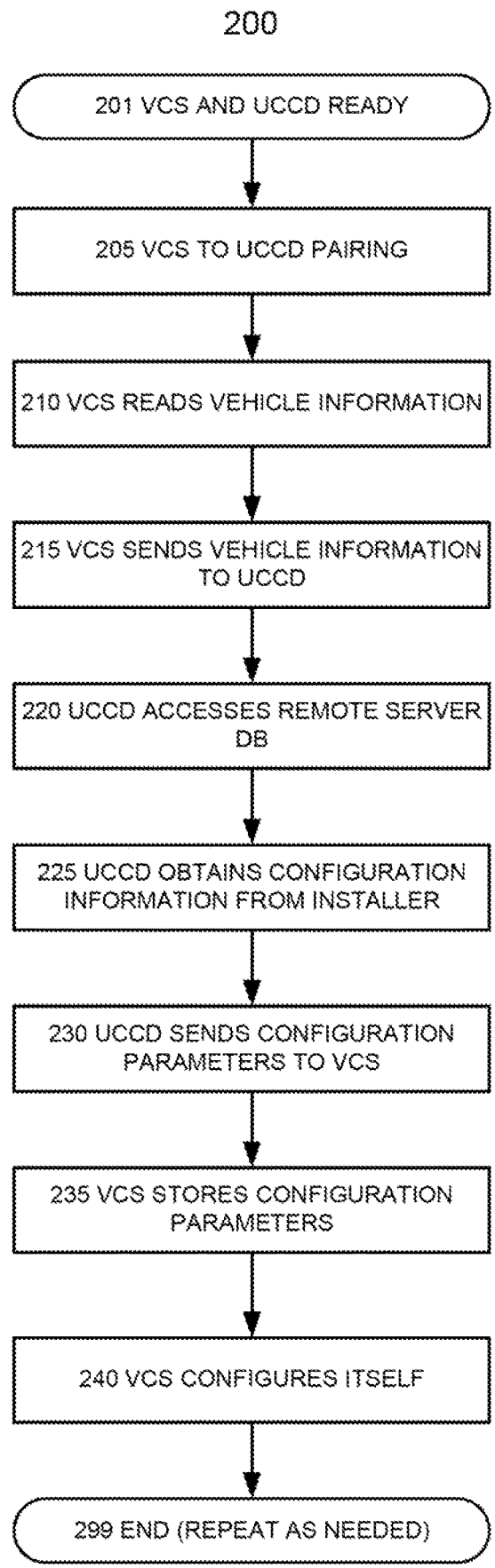
FIG. 2 illustrates selected steps of a process for configuring the Vehicle Control System for a particular vehicle and features, in accordance with selected aspects described in this document.

If the VCS 100 is an aftermarket system, it likely needs to be configured to operate properly when installed in a particular vehicle. If the VCS 100 is an OEM system, it may also need to be configured for the vehicle. FIG. 2 illustrates selected steps of a process 200 for configuring the VCS 100 for the particular vehicle and selected features of the VCS 100.

At flow point 201, the VCS 100 is physically installed in the vehicle and connected to its various systems, such as the power supply; sensors; ECM; TCM; built-in vehicle firmware; built-in security features of the vehicle telematics module; data storage for data that includes the vehicle's usage and performance data and other telematics data; controls for various convenience features (e.g., power windows, power locks, power seats, steering wheel telescoping and tilt positions, audio system presets and other audio system controls). Power from the vehicle is provided to the VCS 100. Additionally, the UCCD 150 (e.g., a smartphone or tablet) is powered up and is located within such range that it can communicate with the VCS 100 (e.g., through the external interlace 125), and executes the installer application provided for the purpose of configuring the VCS 100 in the vehicle.

In step 205, the VCS 100 is put into a pairing mode with the UCCD 150. For example, the ignition of the vehicle can be turned on, and a valet button of the VCS 100 may be held down for a predetermined period of time, to cause the VCS 100 to enter into the pairing mode, such as the Bluetooth pairing mode; the VCS 100 and/or the UCCD 150 may signal the user that the pairing has been accomplished. Thus, after the step 205, the UCCD 150 (here, the installer's device) can communicate with the VCS 100.

In step 210, the VCS 100 accesses the vehicle's systems (e.g., the ECM/TCM/firmware) to read the information sufficient to configure the functionality of the VCS 100 for the vehicle. The information typically includes at least the Vehicle Identification Number ("VIN") or equivalent information from which make, model, year, trim level, and vehicle options can be determined.

In step 215, the VCS 100 transmits to the UCCD 150 the information read in the previous step.

In step 220, the UCCD 150 communicates with the remote server (or one of the remote servers) 180 to obtain access to the database from which the make/model/trim/options and/or other information pertinent to the configuration of the VCS 100 is determined, based on the information from the step 210. The database may be a proprietary one, accessible only with appropriate authorization or credentials. After the installer's log-in (verifying the authorization/credentials), the remote server 180 reads the vehicle's information from the UCCD 150 and responds to the UCCD 150 with the information needed to configure the VCS 100 for the vehicle; the information may include identification of the correct firmware for the vehicle, and or the correct firmware itself.

In step 225, the installer's app running on the UCCD 150 guides the installer in configuring the VCS 100, based on the information received from the remote server 180. The installer may be presented with choices and requests for information and for selections. The installer's responses may be stored on the UCCD 150.

In step 230, the installer's app executing on the UCCD 150 sends the installer's responses and/or appropriate information derived from the responses and the information obtained from the RS 180 database (the configuration parameters) to the VCS 100.

In step 235, the VCS 100 stores the configuration parameters of the VCS 100 in a memory of the VCS 100, such as the non-volatile memory of the memory module 109.

In step 240, the VCS 100 configures itself for the vehicle, based on the configuration parameters. In this step, the VCS 100 may also write information into the vehicle's firmware or other systems, to complete the matchup between the VCS 100 and the vehicle.

The process may then terminate at flow point 299.

Figure 3:
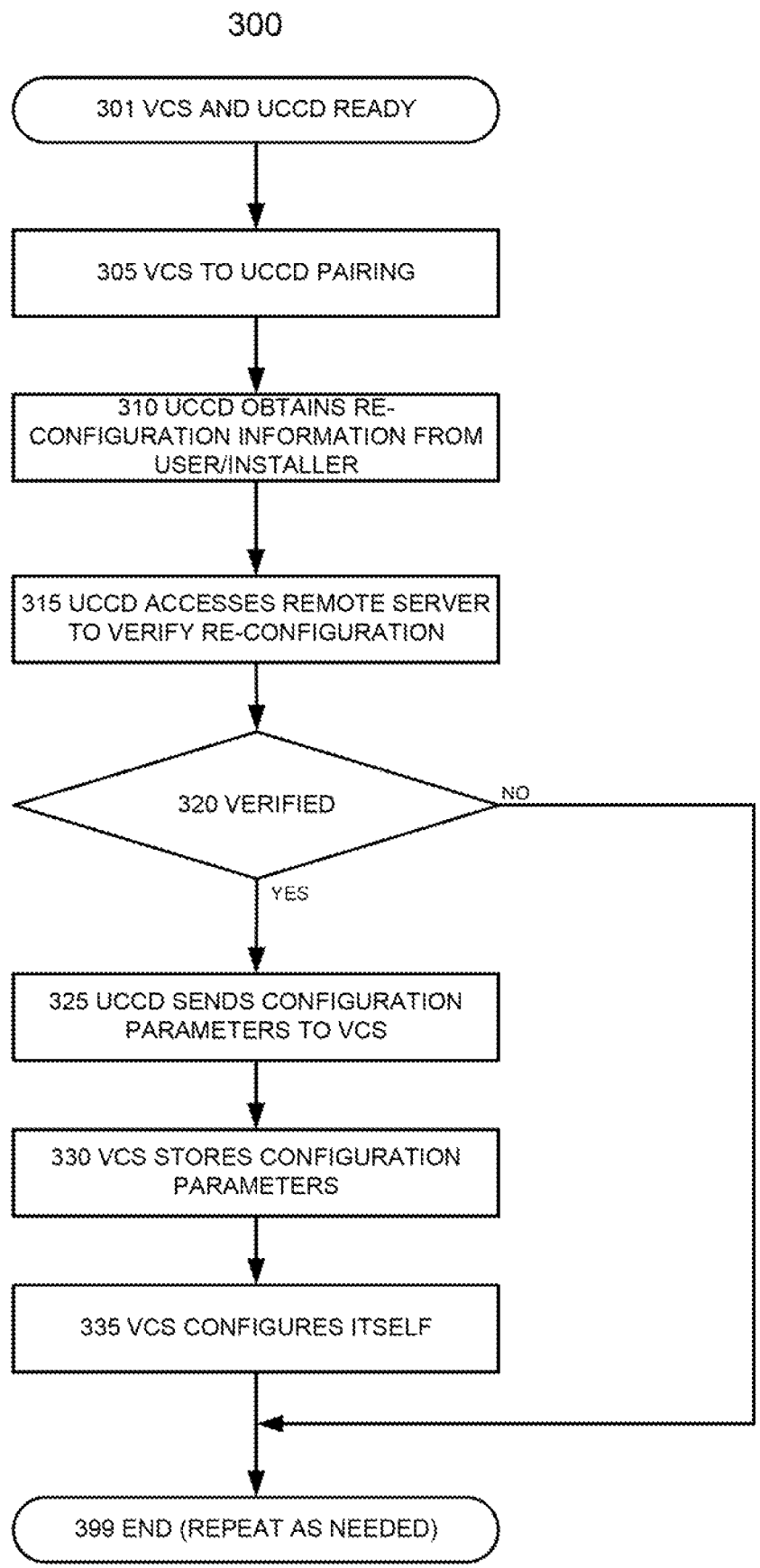
FIG. 3 illustrates selected steps of a process for changing parameter configuration of the Vehicle Control System, in accordance with selected aspects described in this document.

The user of the vehicle and/or the installer may wish to change some of the configuration parameters at a later time that is, after the initial installation. This might be the case, for example, if the user decides to purchase additional features of the VCS 100 or related services, to add accessories, to increase runtime for remote start, or for other reasons. The process for re-installing the VCS 100 or changing the configuration parameters may be quite similar to the process 200 for initially configuring the VCS 100. FIG. 3 illustrates selected steps of a process 300 for changing the parameter configuration. The process 300 may use the installer's app or the end-user's app (the app of the user of the vehicle) executing on the VCS 100, if the end-user's app includes the appropriate functionality. To summarize, the VCS 100 and the UCCD 150 are put into a pairing mode (step 305), the app guides the end-user or the installer in re-configuring the VCS 100 (step 310), by presenting choices and requests for information and for selections. The end-user's or the installer's responses are stored on the UCCD 150. The UCCD 150 verifies the validity/permission for the new parameters with the remote server 180 (step 115, for example, verifying authorization for addition of new features/services or deletion of old ones). If verified (decision block 320), the UCCD 150 transmits the new configuration parameters to the VCS 100 (step 325); if not verified, the process ends (flow point 399), to be repeated as needed or desired. When the VCS 100 receives the new configuration parameters sent in the step 325, the VCS 100 stores the changed parameters in the non-volatile memory of the memory module 109 (step 330), and re-configures itself and possibly also the vehicle based on the changed parameters (step 135). The process then terminates in the flow point 399, to be repeated as needed or desired.

Note that in the process 300 there is no need to obtain the vehicle information from the database of the remote server 180, because the vehicle information is known from the time of the initial information. But in embodiments, the process also obtains the vehicle information and uses it as in the process 200.

Figure 4:
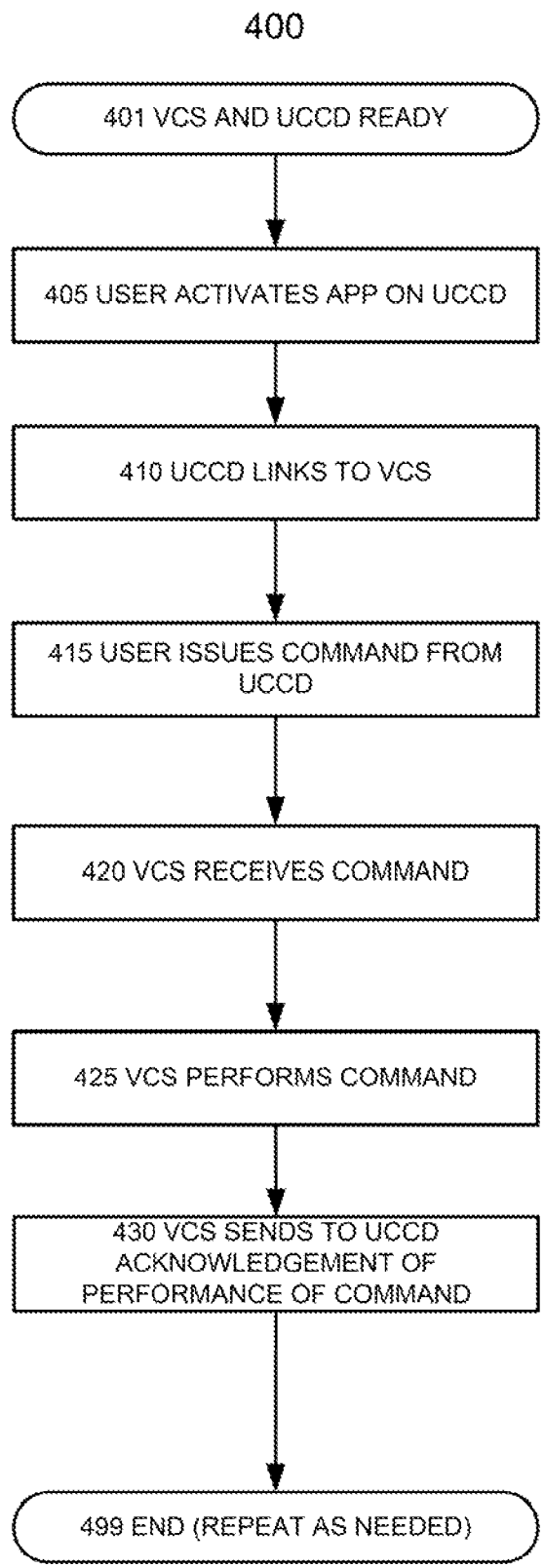
FIG. 4 illustrates selected steps of a process for controlling vehicle features through the User Control and Communication Device.

Once the VCS 100 is installed and configured, the end-user can control the vehicle using the end-user's UCCD 150, running an end-user application. The end-user app, once opened, may automatically pair with the VCS 100, through the Bluetooth or similar transceiver on the UCCD 150 and the external interface 125 of the VCS 100; the app may then display a command interface that allows the end-user to input commands, which the app transmits to the VCS 100. The commands may include controls of the security features of the vehicle (e.g., turn the security system on/off, clear an alarm), convenience features such as the remote start and temperature control, lights flashing and horn on/off, location interrogate (for receiving the vehicle's position at the UCCD 150, and others. FIG. 4 illustrates selected steps of a process 400 for controlling the vehicle features through the UCCD 150 app and the VCS 100.

At flow point 401, the VCS 100 is installed in the vehicle, configured (e.g., through the process 200)), and powered up (as it would typically be regardless of the presence or position of the vehicle's key). Additionally, the VCS 100 is connected to the UCCD 150 through the external interface 125 (or one or more of the interfaces 125); and the end-user app is available on the powered up UCCD 150, which is within communication range of the VCS 100. Note that the communication range may include any cellular service accessible location, when the interface 125 is or includes a cellular interface that can communicate with the UCCD 150.

In step 405, the user activates the app on the UCCD 150, for example, by tapping on the app's icon.

In step 410, the app establishes a communication link (such as a cellular link, a Bluetooth link, another RF link) with the interface 125 of the VCS 100. This may be done automatically upon activation of the app, or require some deliberate action of the end-user.

In step 415, the user issues a command from the app/UCCD 150, for example, by tapping on a particular icon of the app. In response, the app sends a corresponding signal to the VCS 100. The signal corresponds to the icon and may instruct the VCS 100, for example, to start the vehicle remotely, to turn on the climate control system of the vehicle and/or set the temperature of the climate control system, to activate the horn and/or siren, to flash headlights, to lock/unlock the vehicle's doors, to activate panic mode of the vehicle, and to perform any other function for which the vehicle and the VCS 100 are configured; these, of course, are just examples of the available functionalities.

In step 420, the VCS 100 receives the command.

In step 425, the VCS 100 performs the function corresponding to the command.

In step 430, the VCS 100 sends to the UCCD 150 an acknowledgement of the performance of the command.

At flow point 499, the process terminates, to be repeated as needed or desired.

The presence of the communication link between the VCS 100 and the UCCD 150 with the end-user app allows the VCS 150 to communicate with the remote server 180, for example, transmitting to the remote server 180 telematics data and receiving data and firmware updates from the remote server 180. Thus, in operation, the end-user app may run on the UCCD 150, at least occasionally (e.g., continuously, continually, at predetermined times or intervals, at random times), establishing the link (such as the Bluetooth link or 900 MHz link) with the VCS 100. When the link is established, the VCS 100 may transmit to the app/UCCD 150 telematics and/or other data, for subsequent transmission from the app/UCCD 150 to the remote server 180; and the app/UCCD 150 may transmit to the VCS 100 data and/or firmware updates and or interrogation request from the remote server 180.

The features described throughout this document may be present individually, or in any combination or permutation, except where the presence or absence of specific features (elements/limitations) is inherently required, explicitly indicated, or otherwise made clear from the description. This applies whether or not features appear related to specific embodiments.

Although the process steps and decisions (if decision blocks are present) may be described serially in this document, certain steps and/or decisions may be per by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, car is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for configuring/reconfiguring and using a vehicle control system. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in s some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A mobile communication device storing machine-executable mobile installation instructions, wherein the mobile installation instructions configure the mobile communication device to:
   establish a communication link with a vehicle control system (VCS) to be configured for installation in a predetermined vehicle, wherein the communication link is at least in part a radio frequency (RF) link;
   receive from an external wireless RF interface of the VCS vehicle information of the predetermined vehicle;
   transmit the vehicle information to one or more remote servers;
   receive from a first user of the mobile communication device one or more responses regarding configuration of the VCS for the predetermined vehicle;
   receive from the one or more remote servers data for configuring the VCS for the predetermined vehicle, the data comprising one or more configuration parameters based on the one or more responses regarding configuration of the VCS for the predetermined vehicle and the vehicle information; and
   transmit to the VCS through the communication link the one or more configuration parameters.

2. The mobile communication device as in claim 1, wherein the communication link is a Bluetooth link.

3. The mobile communication device as in claim 1, wherein the vehicle information includes a vehicle identification number of the predetermined vehicle.

4. The mobile communication device as in claim 1, wherein make and model of the predetermined vehicle can be determined from the vehicle information.

5. The mobile communication device as in claim 1, wherein make, model, and year of the predetermined vehicle can be determined from the vehicle information.

6. The mobile communication device as in claim 1, wherein make, model, year and vehicle options of the predetermined vehicle can be determined from the vehicle information.

7. The mobile communication device as in claim 1, wherein the mobile installation instructions further configure the mobile communication device to transmit to the one or more remote servers credentials of the first user, the credentials enabling the first user to access a database of the one or more remote servers to obtain the data for configuring the VCS for the predetermined vehicle.

8. The mobile communication device as in claim 1, wherein the data for configuring the VCS for the predetermined vehicle comprises identification of correct firmware for the vehicle.

9. The mobile communication device as in claim 1, wherein the data for configuring the VCS for the predetermined vehicle comprises firmware for the vehicle.

10. The mobile communication device as in claim 1, wherein the mobile communication device further stores reconfiguration instructions, wherein the reconfiguration instructions configure the mobile communication device to:
receive from the first user or another user of the mobile communication device one or more responses regarding reconfiguration of the VCS in the predetermined vehicle using one or more new parameters;
verify with the one or more remote servers validity/permission for reconfiguring the VCS using the one or more new parameters; and
in response to verification with the one or more remote servers of the validity/permission, transmit to the VCS the one or more new parameters.

11. A system comprising the mobile communication device as in claim 1 and the VCS, the VCS being coupled to one or more modules of the vehicle.

12. The system as in claim 11, wherein the mobile communication device is a smart phone.

13. The system as in claim 11, wherein the VCS comprises:
a processor:
an external wireless radio frequency (RF) interface;
a memory module storing VCS instructions for execution by the processor;
an interface to vehicle systems;
a remote start module; and
a bus coupling the processor to the external wireless RF interface, the memory module, the interface to vehicle systems, and the remote start module;
wherein the processor is configured to execute the VCS instructions and to configure the VCS accordance with the one or more configuration parameters.

14. The system as in claim 13, wherein:
the external wireless RF interface comprises a Bluetooth interface, and the communication link is a Bluetooth link; and
the processor is further configured to execute the VCS instructions to read vehicle information that identifies the predetermined vehicle, to transmit through the external wireless RF interface and the communication link the vehicle information to the mobile communication device, to receive from the mobile communication device through the external wireless RF interface and the communication link the one or more configuration parameters, to store the one or more configuration parameters, and to configure the VCS in accordance with the one or more configuration parameters.

15. The system as in claim 14, wherein make, model, year, and vehicle options of the predetermined vehicle can be determined from the vehicle information.

16. A method of configuring a vehicle control system (VCS) installed a vehicle, the method comprising:
establishing a communication link between the VCS and a mobile communication device, wherein the communication link is at least in part of a radio frequency (RF) link;
receiving by the mobile communication device from an external wireless RF interface of the VCS vehicle information of the vehicle;
transmitting the vehicle information from the mobile communication device to one or more remote servers;
receiving by the mobile communication device from a first user of the mobile communication device one or more responses regarding configuration of the VCS;
receiving by the mobile communication device from the one or more remote servers data for configuring the VCS for the predetermined vehicle, the data comprising one or more configuration parameters for installation of the VCS in the predetermined vehicle, the one or more configuration parameters being based on the one or more responses regarding configuration of the VCS and the vehicle information;
transmitting by the mobile communication device to the VCS through the communication link the one or more configuration parameters.

17. The method as in claim 16, further comprising:
receiving by the VCS from the mobile communication device the one or more configuration parameters; and
configuring the VCS in accordance with the one or more configuration parameters.

18. The method as in claim 17, further comprising steps of:
receiving by the mobile communication device from the first user or another user of the mobile communication device one or more responses regarding reconfiguration of the VCS using one or more new parameters;
verifying with the one or more remote servers validity/permission for reconfiguring the VCS using the one or more new parameters, the step of verifying being performed by the mobile communication device;
in response to verification with the one or more remote servers of the validity/permission, transmitting from the mobile communication device to the VCS the one or more new parameters; and
reconfiguring the VCS in accordance with the one or more new parameters.

19. An article of manufacture comprising at least one non-volatile machine-readable storage medium with program code stored in the at least one non-volatile machine-readable storage medium, the program code comprising instructions to configure a mobile communication device to:
establish a communication link between the mobile communication device and a vehicle control system (VCS) installed in a vehicle, wherein the communication link is at least in part a radio frequency (RF) link;

receive from an external wireless RF interface of the VCS vehicle information of the vehicle;

transmit the vehicle information to one or more remote servers;

receive from a first user of the mobile communication device one or more responses regarding configuration of the VCS in the vehicle;

receive from the one or more remote servers data for configuring the VCS for the vehicle, the data comprising one or more configuration parameters for configuring the VCS for installation in the vehicle, the one or more configuration parameters being based on the one or more responses regarding configuration of the VCS in the vehicle and the vehicle information; and transmit to the VCS through the communication link the one or more configuration parameters.

20. The article of manufacture as in claim 19, wherein the program code further comprises instructions to configure the VCS in accordance with the one or more configuration parameters.

* * * * *

UNITED STATES PATENT AND TRADEMARK OFFICE
CERTIFICATE OF CORRECTION

PATENT NO. : 10,720,045 B2  
APPLICATION NO. : 16/269321  
DATED : July 21, 2020  
INVENTOR(S) : James S. Turner and Luc Samson Page 1 of 1

It is certified that error appears in the above-identified patent and that said Letters Patent is hereby corrected as shown below:

In the Claims

Column 9, Line 11, in Claim 6, cancel "year and vehicle" and replace with --year, and vehicle--;

Column 10, Line 13, in Claim 16, cancel "installed a vehicle" and replace with --installed in a vehicle--;

Column 10, Line 16, in Claim 16, cancel "part of a radio" and replace with --part a radio--.

Signed and Sealed this  
Third Day of August, 2021

Drew Hirshfeld  
*Performing the Functions and Duties of the  
Under Secretary of Commerce for Intellectual Property and  
Director of the United States Patent and Trademark Office*